US011469676B2

(12) United States Patent
Nakahara et al.

(10) Patent No.: US 11,469,676 B2
(45) Date of Patent: Oct. 11, 2022

(54) DC-DC CONVERTER (71) Applicant: DIAMOND & ZEBRA ELECTRIC MFG. CO., LTD., Osaka (JP)

(72) Inventors: Shogo Nakahara, Osaka (JP); Hiroyoshi Nakayama, Osaka (JP)

(73) Assignee: DIAMOND ELECTRIC MFG. CO., LTD., Osaka (JP)

(*) Notice: Subject to any disclaimer, the term of this patent is extended or adjusted under 35 U.S.C. 154(b) by 0 days.

(21) Appl. No.: 17/048,254

(22) PCT Filed: Apr. 24, 2019

(86) PCT No.: PCT/JP2019/017379
§ 371 (c)(1),
(2) Date: Oct. 16, 2020

(87) PCT Pub. No.: WO2020/003718
PCT Pub. Date: Jan. 2, 2020

(65) Prior Publication Data
US 2021/0175808 A1 Jun. 10, 2021

(30) Foreign Application Priority Data
Jun. 25, 2018 (JP) .............................. JP2018-119551

(51) Int. Cl.
*H02M 3/335* (2006.01)
*H02M 1/08* (2006.01)
(Continued)

(52) U.S. Cl.
CPC ......... *H02M 3/33507* (2013.01); *H02M 1/08* (2013.01); *H02M 1/38* (2013.01); *H02M 3/3376* (2013.01); *H02M 1/0058* (2021.05)

(58) Field of Classification Search
CPC .. H02M 3/33507; H02M 1/38; H02M 1/0058; H02M 1/0032; H02M 3/33584; H02M 3/33576; Y02B 70/10
See application file for complete search history.

(56) References Cited

U.S. PATENT DOCUMENTS 10,978,964 B2 * 4/2021 Wang ...................... H02M 7/49
2014/0028092 A1 1/2014 Takeshima et al.

FOREIGN PATENT DOCUMENTS

| JP | 2016-012970 A | 1/2016 |
| JP | 2017-085785 A | 5/2017 |
| WO | 2012/144249 A1 | 10/2012 |

OTHER PUBLICATIONS

International Search Report issued in corresponding International Patent Application No. PCT/JP2019/017379, dated Jul. 9, 2019, with English translation.

* cited by examiner

Primary Examiner — Kyle J Moody
(74) Attorney, Agent, or Firm — McDermott Will & Emery LLP (57) ABSTRACT A DC-DC converter has a configuration in which a first full-bridge circuit and a second full-bridge circuit are connected via a transformer and an inductor. A control circuit controls soft switching of each switching element in the first full-bridge circuit and the second full-bridge circuit. An inductor current flowing through an equivalent inductor at a time of switching of turning on or off each switching element is greater than or equal to a threshold current, the equivalent inductor being equivalent to the transformer and the inductor. The control circuit outputs predetermined power by changing a voltage output period of the first full-bridge circuit and a voltage output period of the second full-bridge circuit while fixing the switching frequency and (Continued)

keeping constant a polarity inversion period in which the output of the second full-bridge circuit and the output of the first full-bridge circuit have reverse polarities. This enables performing ZVS operations by simple control and reducing switching losses.

13 Claims, 9 Drawing Sheets

(51) Int. Cl.
    *H02M 1/38*     (2007.01)
    *H02M 3/337*     (2006.01)
    *H02M 1/00*     (2006.01)

DC-DC CONVERTER

CROSS REFERENCE TO RELATED APPLICATIONS

This application is the U.S. National Phase under 35 U.S.C. § 371 of International Application No. PCT/JP2019/017379, filed on Apr. 24, 2019, which claims the benefit of Japanese Application No. 2018-119551, filed on Jun. 25, 2018, the entire contents of each are hereby incorporated by reference.

TECHNICAL FIELD

The present invention relates to a DC-DC converter that performs soft switching.

BACKGROUND ART

Power converters such as DC-DC converters employ zero voltage switching (hereinafter, referred to as "ZVS") in order to reduce switching losses and achieve high-efficiency power transfer or in order to reduce noise and suppress switching surges so as to enable the use of low-cost, low withstand voltage devices. Patent Document 1 discloses a DC-DC converter capable of high-efficiency power transfer by implementing ZVS operations when there is a large voltage difference between a primary direct-current voltage and a secondary direct-current voltage. The DC-DC converter described in Patent Document 1 detects power on each of the primary and secondary sides and increases or decreases the duties of primary switches and the duties of secondary switches so as to minimize a power difference between the two sides. This allows implementation of ZVS operations.

PRIOR ART DOCUMENT

Patent Document

Patent Document 1: Japanese Patent Application Laid-Open No. 2016-012970

SUMMARY OF INVENTION

Problems to be Solved by Invention

However, in order to implement ZVS operations, Patent Document 1 requires detecting power on both of the primary and secondary sides and performing switching control. This complicates the circuit configuration and control of the circuit configuration, thus making it difficult to improve productivity and achieve cost reduction.

It is an object of the present invention to provide a DC-DC converter that performs ZVS operations by simple control and reduces switching losses.

Means for Solving Problems

In order to solve the above-described problem, a DC-DC converter according to a first aspect of the present invention includes a first full-bridge circuit including four switching elements that include a capacitor serving as a parasitic capacitance or an external parallel-connected capacitor, a second full-bridge circuit including four switching elements that include a capacitor serving as a parasitic capacitance or an external parallel-connected capacitor, a transformer including a first winding and a second winding, the first winding being connected to the first full-bridge circuit, and the second winding being connected to the second full-bridge circuit and magnetically coupled to the first winding, an inductance component connected in series with the first winding or the second winding, and a control circuit that controls soft switching of each switching element in the first full-bridge circuit and the second full-bridge circuit. The control circuit is capable of executing an output angle modulation mode and a frequency modulation mode and executes either the output angle modulation mode or the frequency modulation mode depending on target power desired to be output, the output angle modulation mode being a mode of adjusting a voltage output period of the first full-bridge circuit and a voltage output period of the second full-bridge circuit, and the frequency modulation mode being a mode of adjusting a switching frequency.

A second aspect of the present invention is the DC-DC converter of the first aspect, in which an inductor current flowing through an equivalent inductor at a time of switching of turning on or off each switching element is greater than or equal to a threshold current, the equivalent inductor being equivalent to the transformer and the inductance component.

A third aspect of the present invention is the DC-DC converter of the first or second aspect, in which the control circuit executes the output angle modulation mode when the target power is less than threshold power, and the control circuit executes the frequency modulation mode when the target power is greater than or equal to the threshold power.

A fourth aspect of the present invention is the DC-DC converter of the first or second aspect, in which the control circuit is capable of executing the output angle modulation mode, the frequency modulation mode, and a phase control mode and executes the output angle modulation mode, the frequency modulation mode, or the phase control mode depending on target power desired to be output, the phase control mode being a mode of changing a phase of a voltage on the first winding and a phase of a voltage on the second winding.

A fifth aspect of the present invention is the DC-DC converter of the fourth aspect, in which the control circuit executes the output angle modulation mode when the target power is less than first threshold power, the control circuit executes the frequency modulation mode when the target power is greater than or equal to the first threshold power, and the control circuit executes the phase control mode when the target power is greater than or equal to second threshold power that is greater than the first threshold power.

A DC-DC converter according to a sixth aspect of the present invention includes a first full-bridge circuit including four switching elements that include a capacitor serving as a parasitic capacitance or an external parallel-connected capacitor, a second full-bridge circuit including four switching elements that include a capacitor serving as a parasitic capacitance or an external parallel-connected capacitor, a transformer including a first winding and a second winding, the first winding being connected to the first full-bridge circuit, and the second winding being connected to the second full-bridge circuit and magnetically coupled to the first winding, an inductance component connected in series with the first winding or the second winding, and a control circuit that controls soft switching of each switching element in the first full-bridge circuit and the second full-bridge circuit. The control circuit is capable of executing an output angle modulation mode or a phase control mode and executes the output angle modulation mode or the phase control mode depending on target power desired to be output, the output angle modulation mode being a mode of adjusting a voltage output period of the first full-bridge circuit and a voltage output period of the second full-bridge circuit, and the phase control mode being a mode of changing a phase of a voltage on the first winding and a phase of a voltage on the second winding.

A seventh aspect of the present invention is the DC-DC converter of the sixth aspect, in which an inductor current flowing through an equivalent inductor at a time of switching of turning on or off each switching element is greater than or equal to a threshold current, the equivalent inductor being equivalent to the transformer and the inductance component.

An eighth aspect of the present invention is the DC-DC converter of the first to seventh aspects, in which the threshold current is set to make energy accumulated in the equivalent inductor greater than or equal to energy accumulated in two of the capacitors.

A ninth aspect of the present invention is the DC-DC converter of the eighth aspect, in which the following expression is satisfied:

$$I_{ref} = \alpha \cdot V_x \sqrt{(2C/L)}$$

where $I_{ref}$ is the threshold current, $V_x$ is an input voltage of the first full-bridge circuit, C is a capacitance of the capacitors, L is an inductance of the equivalent inductor, and $\alpha$ is a correction factor.

Advantageous Effects of Invention

According to the first to ninth aspects of the present invention, the output angle modulation mode and the frequency modulation mode are switched depending on the switching frequency. By appropriately switching the mode, it is possible to suppress an increase in switching loss resulting from an increase in switching frequency. That is, the switching of each switching element is controlled depending on target power desired to be output. This prevents the circuit configuration from becoming complicated and enables performing ZVS operations by simple control and reducing switching losses.

In particular, according to the third aspect, since the switching frequency remains unchanged during low-power output, it is possible to suppress an increase in switching loss resulting from an increase in switching frequency. Moreover, since there is no increase in frequency, it is possible to reduce heat generation of devices, in particular, the inductor.

DESCRIPTION OF EMBODIMENTS

An embodiment of the present invention will be described hereinafter with reference to the drawings. The following description takes the example of using a dual-active-bridge (DAB) converter (hereinafter, referred to as a "DC-DC converter") as a "DC-DC converter" according to the present invention.

1. Circuit Configuration of DC-DC Converter

Figure 1:
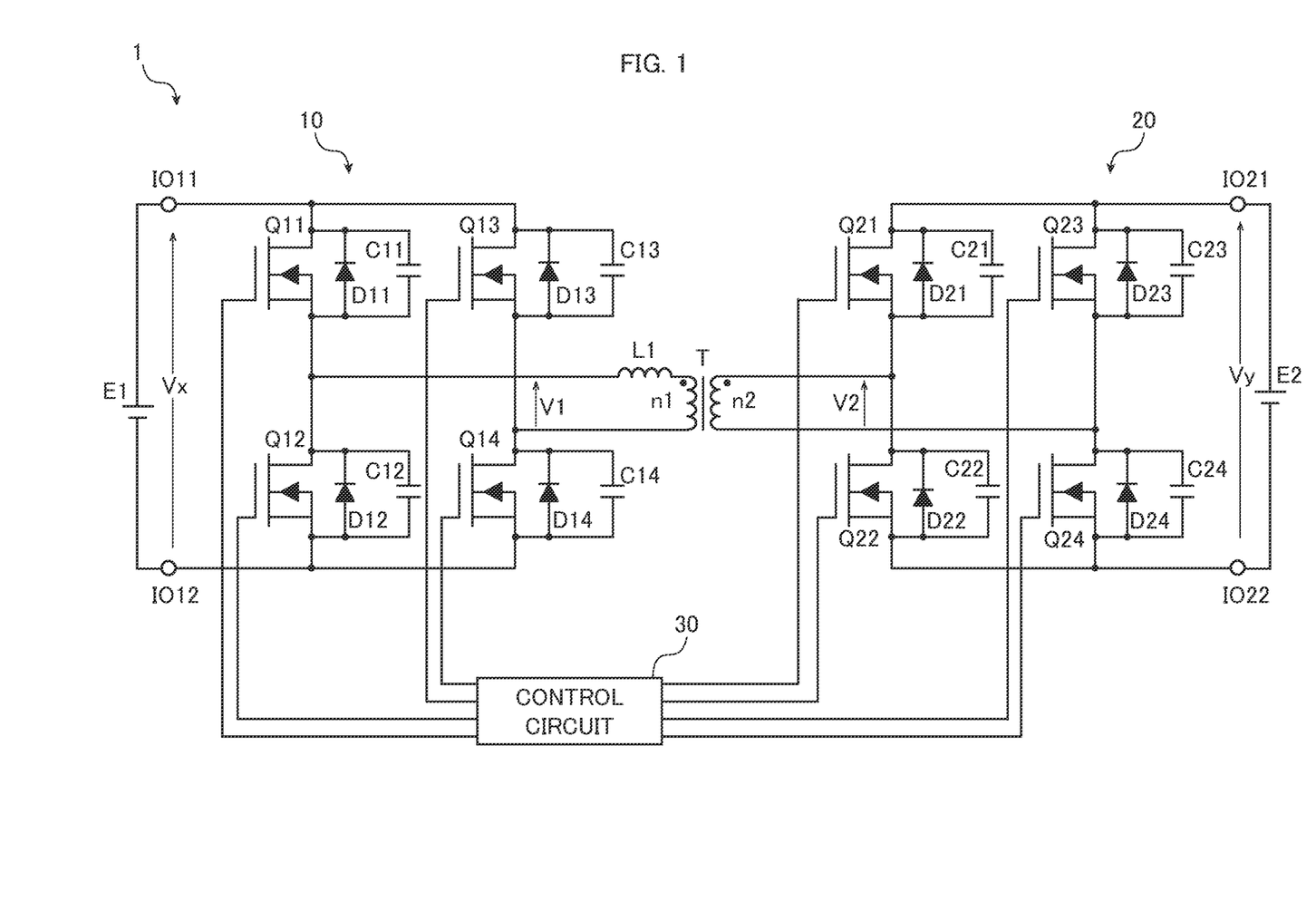
FIG. 1 is a circuit diagram of a DC-DC converter according to an embodiment.

FIG. 1 is a circuit diagram of a DC-DC converter 1 according to an embodiment of the present invention.

The DC-DC converter 1 includes a pair of input/output terminals IO11 and IO12 and a pair of input/output terminals IO21 and IO22. The pair of input/output terminals IO11 and IO12 is connected to a direct-current power supply E1. The pair of input/output terminals IO21 and IO22 is connected to a direct-current power supply E2.

The DC-DC converter 1 transforms a power supply voltage of the direct-current power supply E1 that is input from the input/output terminals IO11 and IO12, and outputs the transformed voltage from the input/output terminals IO21 and IO22. The DC-DC converter 1 also transforms a power supply voltage of the direct-current power supply E2 that is input from the input/output terminals IO21 and IO22, and outputs the transformed voltage from the input/output terminals IO11 and IO12. That is, the DC-DC converter 1 is a converter capable of bidirectional power transfer.

The DC-DC converter 1 includes a first full-bridge circuit 10, a second full-bridge circuit 20, and a transformer T.

The transformer T includes a first winding n1 and a second winding n2. The first winding n1 and the second winding n2 are magnetically coupled to each other. The first winding n1 is connected to the input/output terminals IO11 and IO12 via the first full-bridge circuit 10. The second winding n2 is connected to the input/output terminals IO21 and IO22 via the second full-bridge circuit 20.

The first full-bridge circuit 10 includes a first leg in which switching elements Q11 and Q12 are connected in series, and a second leg in which switching elements Q13 and Q14 are connected in series. The switching element Q11 is connected in parallel with a diode D11 and a capacitor C11, the switching element Q12 is connected in parallel with a diode D12 and a capacitor C12, the switching element Q13 is connected in parallel with a diode D13 and a capacitor C13, and the switching element Q14 is connected in parallel with a diode D14 and a capacitor C14. The switching elements Q11 to Q14 are MOS-FETs. Alternatively, the switching elements Q11 to Q14 may be other transistors such as IGBTs or JFETs. The diodes D11 to D14 may be actual elements or parasitic diodes. Each of the capacitors C11 to C14 may be an actual element, a parasitic capacitance, or a combination of a parasitic capacitance and an actual element.

The first winding n1 of the transformer T is connected to the midpoint of each of the first leg and the second leg. An inductor L1 is provided between the first winding n1 of the transformer T and the midpoint of the first leg. Note that the location of the inductor L1 may be appropriately changed as long as the inductor L1 is connected in series with either the first winding n1 or the second winding n2. For example, the inductor L1 may be provided between the first winding n1 and the midpoint of the second leg. The inductor L1 may be an actual element, a leakage inductance of the transformer T, or a combination of an actual element and a leakage inductance.

The second full-bridge circuit 20 includes a third leg in which switching elements Q21 and Q22 are connected in series, and a fourth leg in which switching elements Q23 and Q24 are connected in series. The switching element Q21 is connected in parallel with a diode D21 and a capacitor C21, the switching element Q22 is connected in parallel with a diode D22 and a capacitor C22, the switching element Q23 is connected in parallel with a diode D23 and a capacitor C23, and the switching element Q24 is connected in parallel with a diode D24 and a capacitor C24. The switching elements Q21 to Q24 are MOS-FETs. Alternatively, the switching elements Q21 to Q24 may be other transistors such as IGBTs or JFETs. The diodes D21 to D24 may be actual elements or parasitic diodes. Each of the capacitors C21 to C24 may be an actual element, a parasitic capacitance, or a combination of a parasitic capacitance and an actual element.

The second winding n2 of the transformer T is connected to the midpoint of each of the third leg and the fourth leg. The aforementioned inductor L1 may be provided between the second winding n2 and the midpoint of either the third leg or the fourth leg.

The gate terminals of the switching elements Q11 to Q14 and Q21 to Q24 are connected to a control circuit 30. The control circuit 30 controls switching of each of the switching elements Q11 to Q14 and Q21 to Q24 so that the output power of the DC-DC converter 1 becomes set target power. In the present embodiment, the control circuit 30 performs soft switching of each of the switching elements Q11 to Q14 and Q21 to Q24 in order to reduce switching losses.

2. Soft Switching Operations

Soft switching operations of the switching elements Q11 to Q14 and Q21 to Q24 will be described hereinafter. The present embodiment adopts 3-level DAB control.

The DC-DC converter 1 transfers power from either the input/output terminals IO11 and IO12 or the input/output terminals IO21 and IO22 to the other, or vice versa. The following description is given on the assumption that the input/output terminals IO11 and IO12 are on the input side (primary side) and the input/output terminals IO21 and IO22 are on the output side (secondary side).

Figure 2:
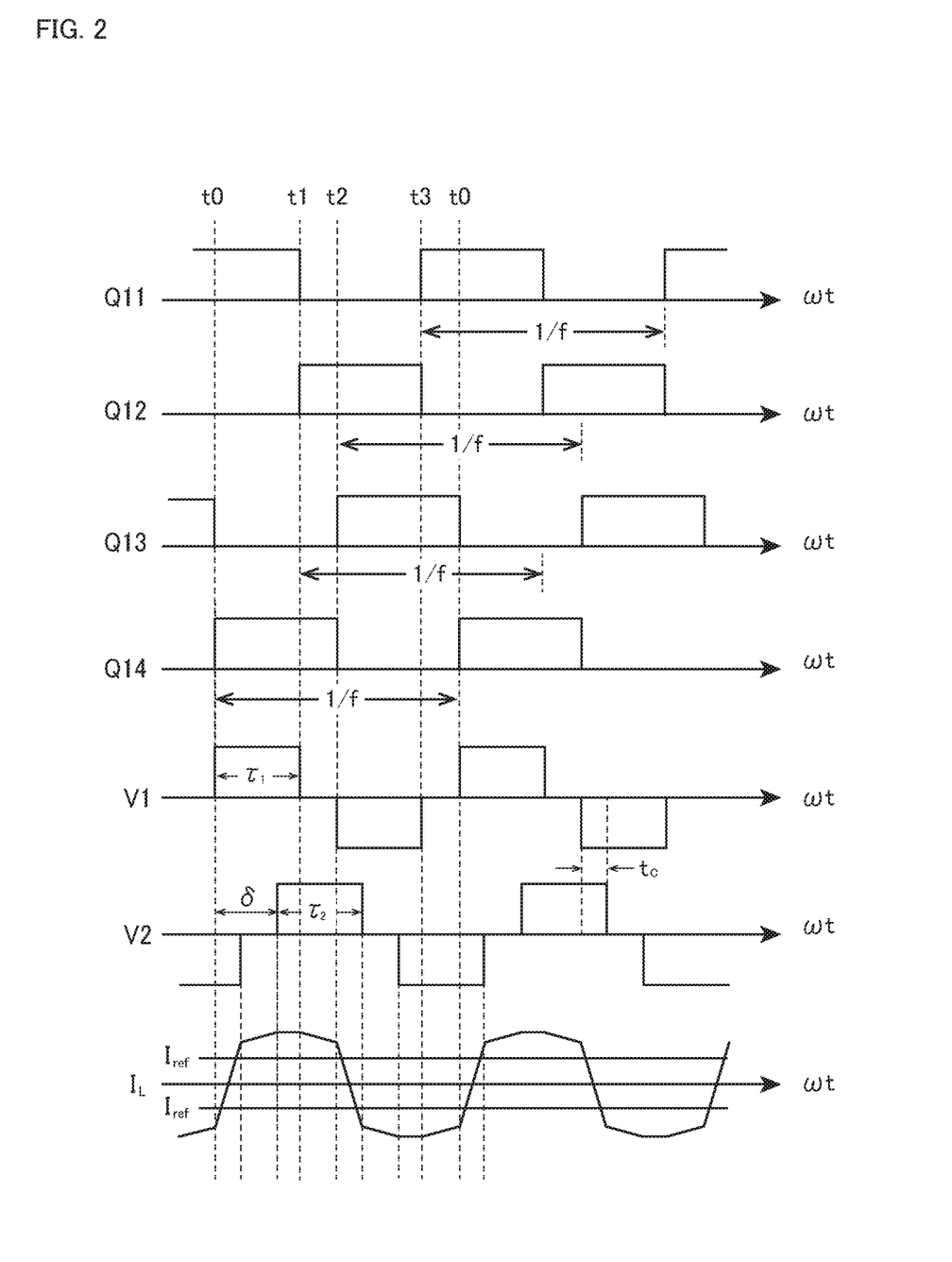
FIG. 2 is a diagram illustrating a timing chart of the DC-DC converter.

FIG. 2 is a diagram illustrating a timing chart of the DC-DC converter 1. FIGS. 3, 4, 5, 6, 7, and 8 are illustrations of current paths in the DC-DC converter 1. In FIGS. 3 to 8, the second full-bridge circuit 20 is not shown, and the inductor L1 and the transformer T in FIG. 1 are expressed as an equivalent inductor L.

The timing chart of only the switching elements Q11 to Q14 in the first full-bridge circuit 10 is illustrated in FIG. 2. In FIG. 2, V1 indicates the voltage between the midpoint of the switching elements Q11 and Q12 and the midpoint of the switching elements Q13 and Q14, illustrated in FIG. 1, and V2 indicates the voltage between the midpoint of the switching elements Q21 and Q22 and the midpoint of the switching elements Q23 and Q24. In this example, the direct-current power supplies E1 and E2 are assumed to supply the same power supply voltage, and $I_L$ indicates an inductor current flowing through the inductor L (see FIGS. 3 to 8).

The control circuit 30 provides a phase difference and controls switching of the first full-bridge circuit 10 and the second full-bridge circuit 20. In the following description, the phase difference between the first full-bridge circuit 10 and the second full-bridge circuit 20 is expressed as δ. The control circuit 30 performs phase-shift PWM control at a switching frequency f (in the cycle of 1/f) on each of the first full-bridge circuit 10 and the second full-bridge circuit 20.

The following description is given of switching control performed on each of the switching elements Q11 to Q14 in the first full-bridge circuit 10. The switching of the second full-bridge circuit 20 is controlled such that the voltage V2 has a waveform illustrated in FIG. 2. This can be described in the same manner as the switching control of the first full-bridge circuit 10. Thus, in FIGS. 3 to 8, only current paths in the first full-bridge circuit 10 are illustrated in order to simplify the description. In each drawing, each switching element is indicated by a simplified graphical symbol.

Period from t0 to t1

In the period from t0 to t1, the switching elements Q11 and Q14 are ON and the switching elements Q12 and Q13 are OFF.

Figure 3:
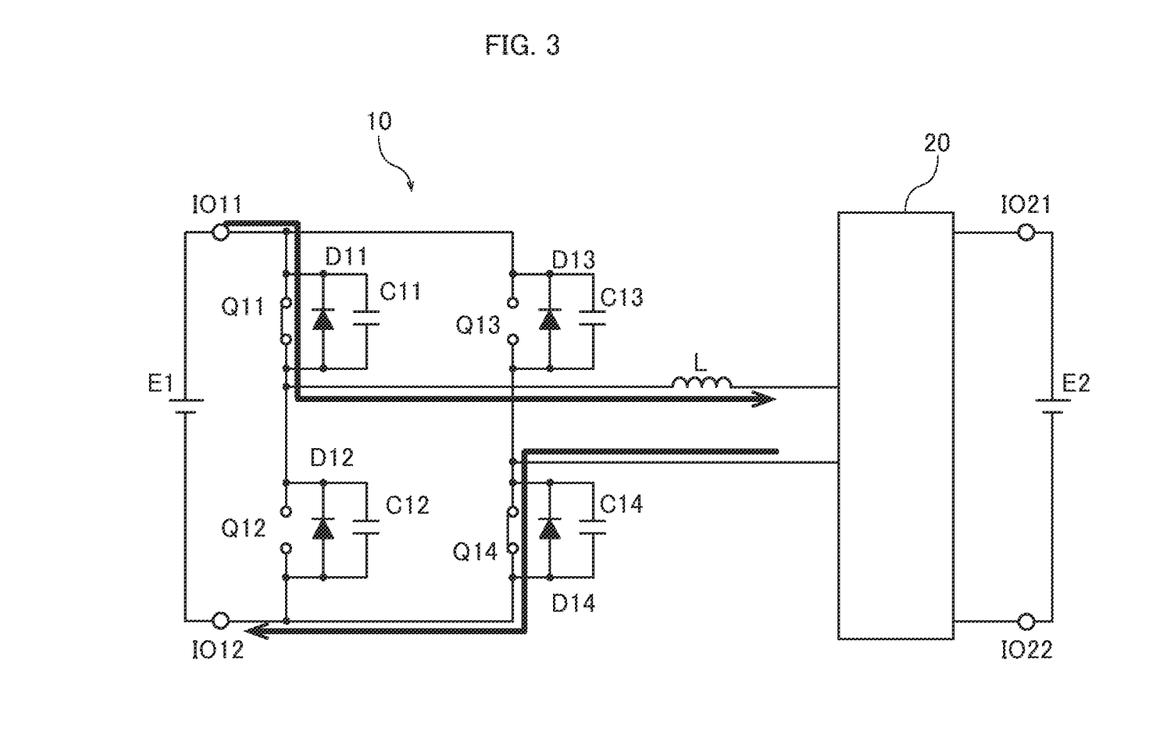
FIG. 3 is an illustration of a current path in the DC-DC converter.

In this case, current flows in sequence from the direct-current power supply E1 through the switching element Q11, the inductor L, the second full-bridge circuit 20, and the switching element Q14 to the direct-current power supply E1 as illustrated in FIG. 3. During this period, the voltage V1 is high.

Figure 4:
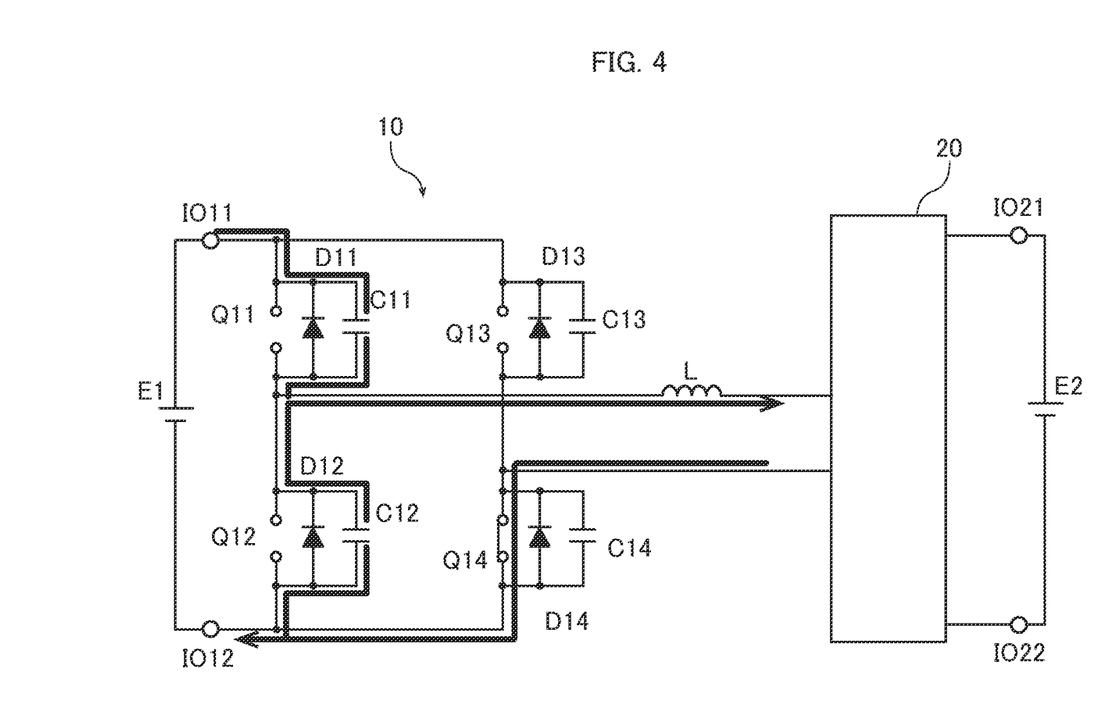
FIG. 4 is an illustration of a current path in the DC-DC converter.

At time t1, the switching element Q11 is turned off, and then the switching element Q12 is turned on after a dead-time interval. During this dead-time interval, the switching elements Q11 and Q12 are both OFF. At this time, the inductor current $I_L$ continues to flow through the inductor L due to the property of the inductor L, so that current flows from each of the capacitors C11 and C12 to the inductor L as illustrated in FIG. 4. The capacitor C11 is charged, and the capacitor C12 is discharged. When the capacitor C12 has been discharged, the drain-source voltage of the switching element Q12 becomes zero. If the switching element Q12 is turned on at this time, this turn-on is achieved by ZVS.

Period from t1 to t2

Figure 5:
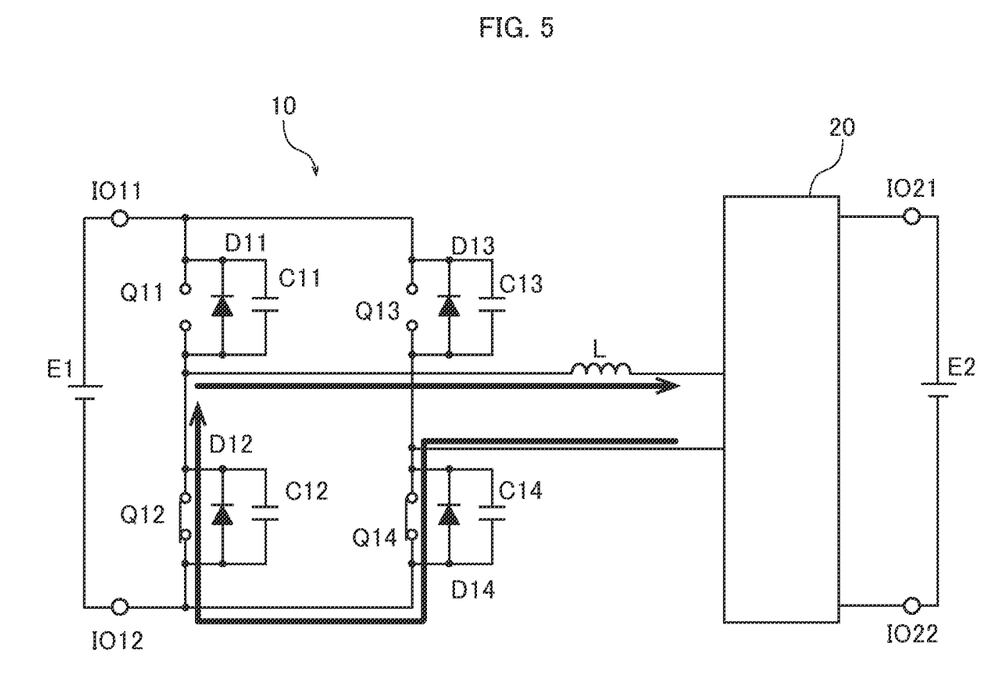
FIG. 5 is an illustration of a current path in the DC-DC converter.

In the period from t1 to t2, the switching elements Q12 and Q14 are ON and the switching elements Q11 and Q13 are OFF. In this case, current flows in a path from the switching elements Q14 and Q12 to the inductor L as illustrated in FIG. 5. At this time, the voltage V1 is zero.

At time t2, the switching element Q14 is turned off, and then the switching element Q13 is turned on after a dead-time interval. During this dead-time interval, the capacitor C14 is charged, and the capacitor C13 is discharged as described with reference to FIG. 4. When the capacitor C13 has been discharged, the drain-source voltage of the switching element Q13 becomes zero. If the switching element Q13 is turned on at this time, this turn-on is achieved by ZVS.

Period from t2 to t3

Figure 6:
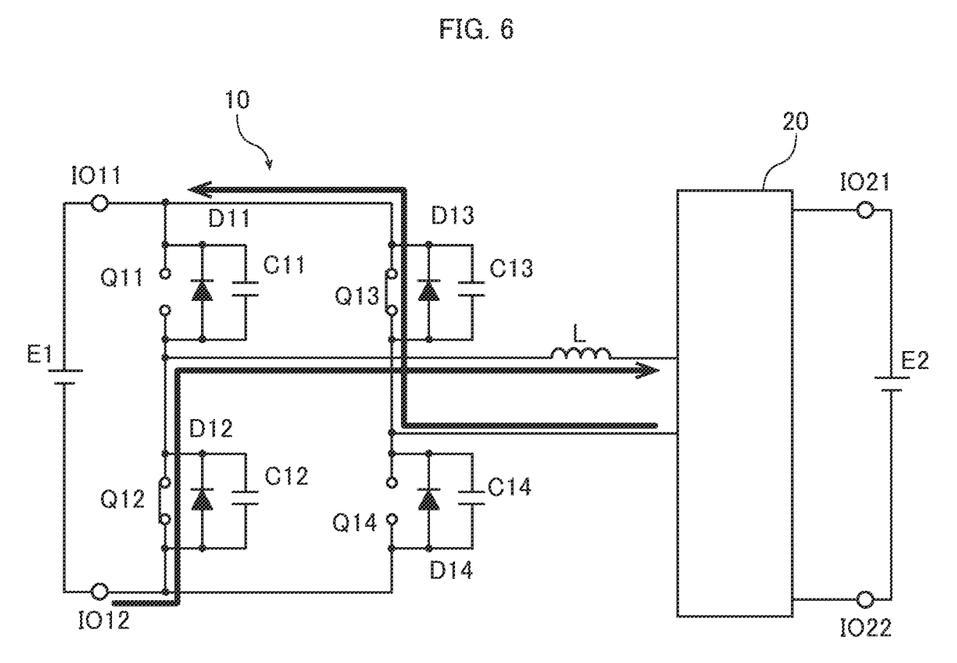
FIG. 6 is an illustration of a current path in the DC-DC converter.
Figure 7:
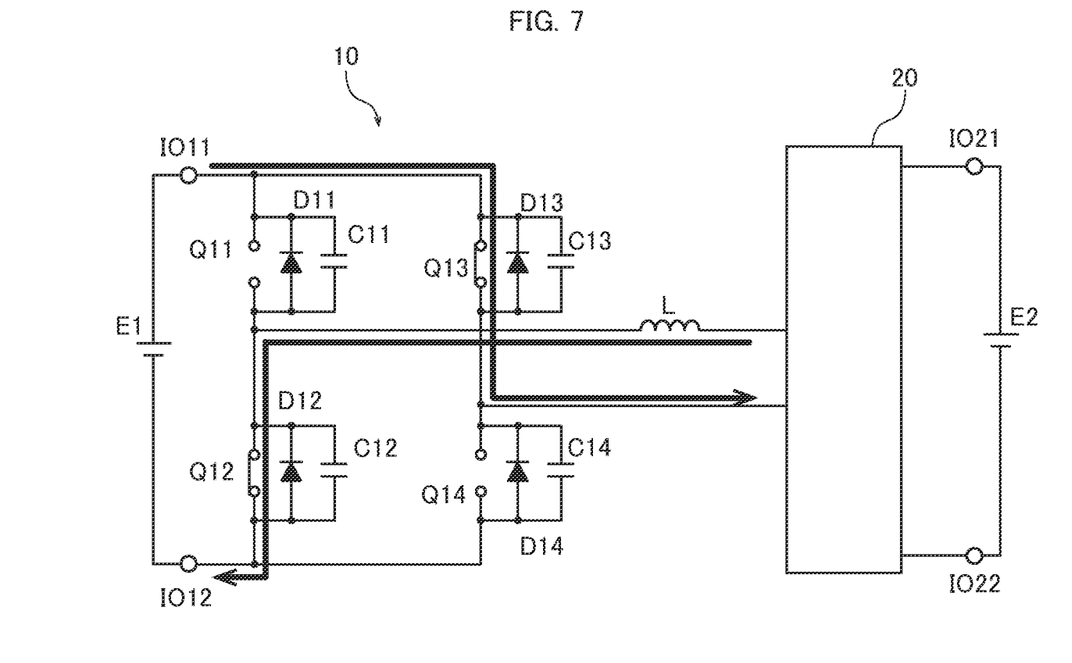
FIG. 7 is an illustration of a current path in the DC-DC converter.

In the period from t2 to t3, the switching elements Q12 and Q13 are ON and the switching elements Q11 and Q14 are OFF. Immediately after the switching element Q13 is turned on at time t2, current flows in a path from the direct-current power supply E1 through the switching element Q12, the inductor L, the second full-bridge circuit 20, and the switching element Q13 to the direct-current power supply E1 as illustrated in FIG. 6. This current flows back to the direct-current power supply E1 and, as a result, flows in a path from the direct-current power supply E1 through the switching element Q13, the second full-bridge circuit 20, the inductor L, and the switching element Q12 to the direct-current power supply E1 as illustrated in FIG. 7. The polarity of the voltage V1 in this period is the reverse of that in the period from t0 to t1.

At time t3, the switching element Q12 is turned off, and then the switching element Q11 is turned on after a dead-time interval. Then, the capacitor C12 is charged, and the capacitor C11 is discharged as described with reference to FIG. 4. When the capacitor C11 has been discharged, the drain-source voltage of the switching element Q11 becomes zero. If the switching element Q11 is turned on at this time, this turn-on is achieved by ZVS.

Period from t3 to t0

Figure 8:
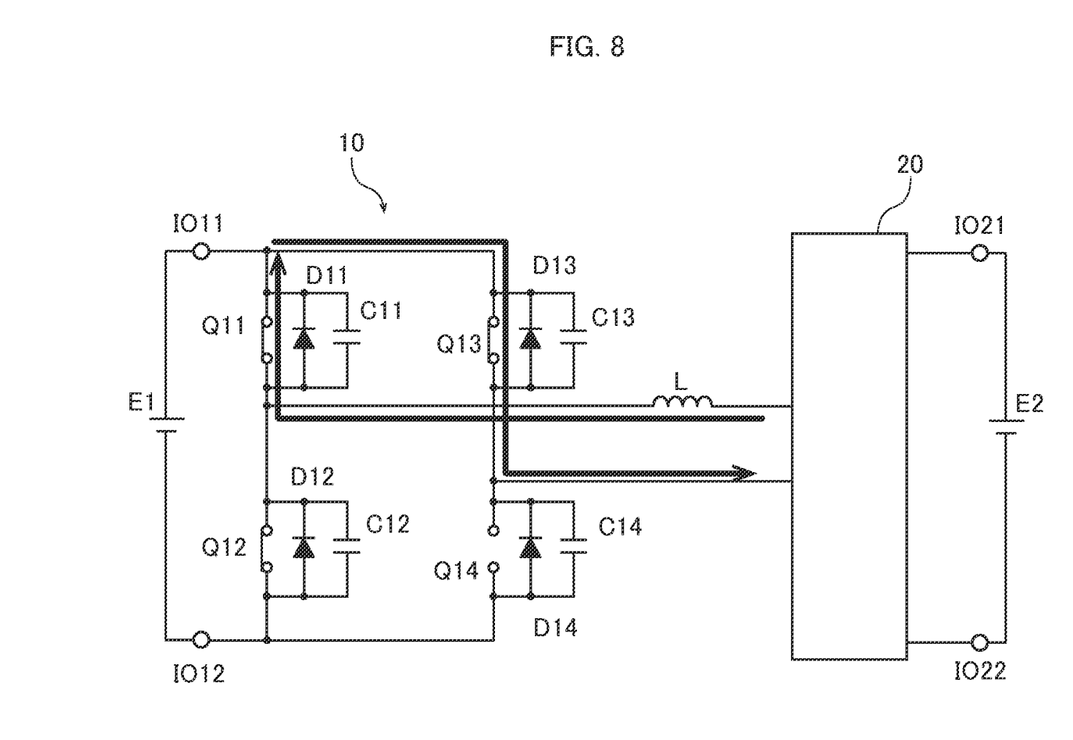
FIG. 8 is an illustration of a current path in the DC-DC converter.

In the period from t3 to t0, the switching elements Q11 and Q13 are ON and the switching elements Q12 and Q14 are OFF. In this case, current flows in a path from the inductor L through the switching element Q11 to the switching element Q13 as illustrated in FIG. 8. At this time, the voltage V1 is zero.

At time t0, the switching element Q13 is turned off, and then the switching element Q14 is turned on after a dead-time period. Then, the capacitor C13 is charged and the capacitor C14 is discharged as described with reference to FIG. 4. When the capacitor C14 has been discharged, the drain-source voltage of the switching element Q14 becomes zero. If the switching element Q14 is turned on at this time, this turn-on is achieved by ZVS. Then, the converter transitions to the state illustrated in FIG. 3.

The switching control as described above causes the voltage V1 to transition so as to have a waveform illustrated in FIG. 2. As a result of the control circuit 30 controlling the switching of the second full-bridge circuit 20, the voltage V2 transitions so as to have a waveform illustrated in FIG. 2. Since, as described above, the switching of the first full-bridge circuit 10 and the second full-bridge circuit 20 is controlled with the phase difference δ, a phase difference between the rising edge of the voltage V1 and the rising edge of the voltage V2 becomes δ.

3. Output Power of DC-DC Converter

When controlling the output power of the DC-DC converter 1, the control circuit 30 performs the control in either the output angle modulation mode or the frequency modulation mode, depending on the output power. The output angle modulation mode and the frequency modulation mode will be described hereinafter.

Figure 9:
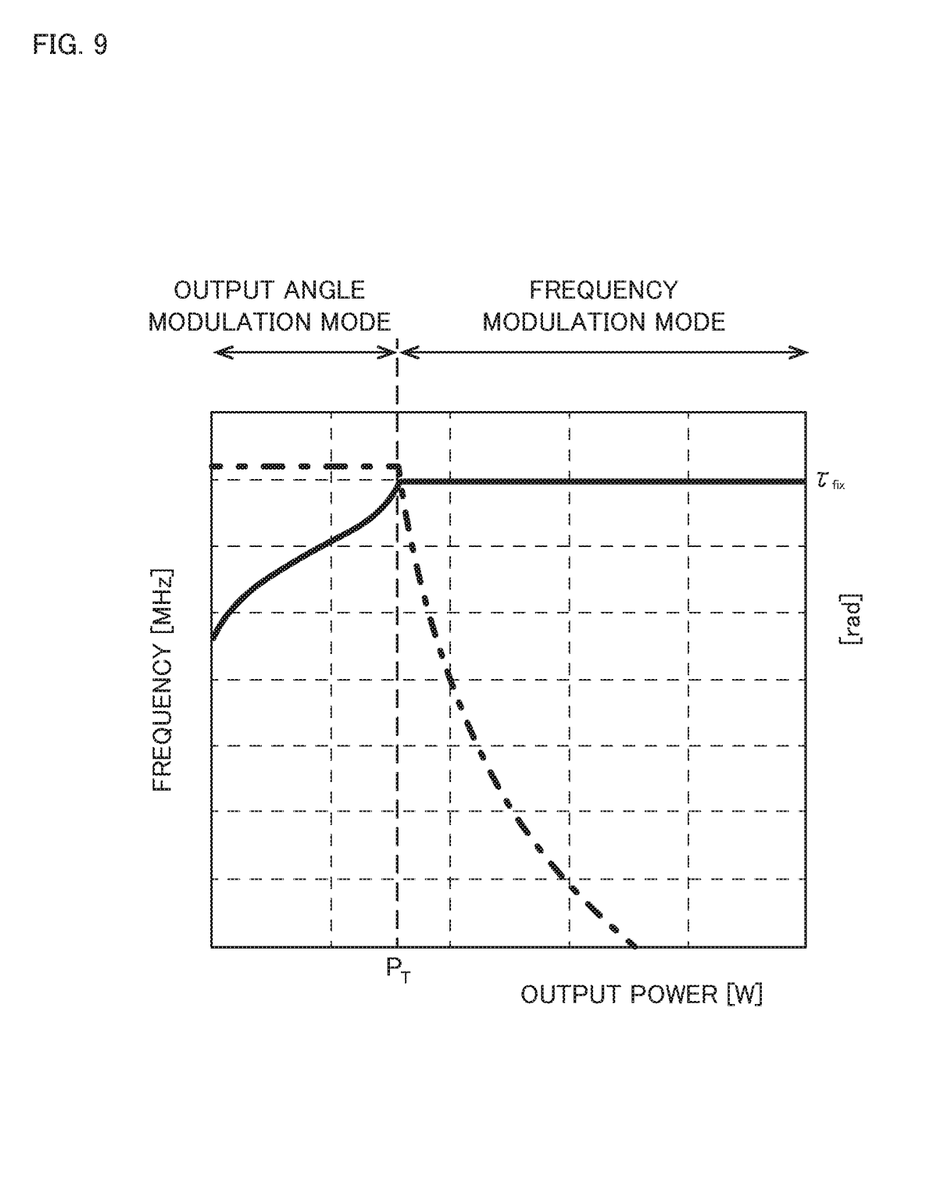
FIG. 9 is an illustration of control performed in each of an output angle modulation mode and a frequency modulation mode.

FIG. 9 is an illustration of control performed in each of the output angle modulation mode and the frequency modulation mode.

Here, a polarity inversion period in which the voltages V1 and V2 have reverse polarities is expressed as $\tau_c$. Also, the voltage output period of the first full-bridge circuit 10 is expressed as $\tau_1$, and the voltage output period of the second full-bridge circuit 20 is expressed as $\tau_2$. Here, $\tau_1$, $\tau_2$, and $\tau_c$ (see FIG. 2 of all) express times in angular (radian) measure. In this example, $\tau_1=\tau_2$, and $\tau_1$ and $\tau_2$ can be expressed by $\tau_1=\tau_2=\tau$. The solid line in FIG. 9 indicates a change in T. The dashed dotted line in FIG. 9 indicates a change in switching frequency f. The horizontal axis in FIG. 9 indicates the output power.

First, the output angle modulation mode will be described.

When the DC-DC converter 1 outputs low power, the control circuit 30 controls the output of the DC-DC converter 1 in the output angle modulation mode. In the output angle modulation mode, the control circuit 30 controls the output power of the DC-DC converter 1 to become a target value by changing $\tau_1$ and $\tau_2$ while fixing the switching frequency f and the polarity inversion period $\tau_c$.

The voltage output period Ti may be changed by controlling the phase of each switching element in the first full-bridge circuit 10. The voltage output period $\tau_2$ may be changed by controlling the phase of each switching element in the second full-bridge circuit 20.

The fixed value $\tau_c$ is set so as to enable ZVS of each switching element. Thus, $\tau_c$ has to satisfy the condition given by Expression (1) below.

$$\tau_C \geq \frac{I_{ref} \cdot L}{V_x} \quad (1)$$

In Expression (1) above, L is the inductance of the inductor L illustrated in, for example, FIG. 3, and $V_x$ is the power supply voltage of the direct-current power supply E1 (see FIG. 1).

Also, $I_{ref}$ is the current value of the inductor current $I_L$ required to achieve ZVS. As described above, for example if the drain-source voltage of the switching element Q12 becomes zero after the charge of the capacitor C11 and the discharge of the capacitor C12 during the dead-time interval (FIG. 4) at time t1, the turn-on of the switching element Q12 is achieved by ZVS. That is, the ZVS of the switching element Q12 becomes possible if the energy of the inductor L is at least greater than or equal to the energy accumulated in each of the capacitors C11 and C12. To achieve this, Expression (2) below has to hold.

$$\tfrac{1}{2}LI_L^2 \geq \tfrac{1}{2} \cdot 2CV_x^2 \quad (2)$$

In expression (2), $I_L$ is the inductor current flowing through the inductor L, and C is the capacitance of each of the capacitors C11 to C14. Then, Expression (2) is transformed into Expression (3) below. In Expression (3), α is the correction factor and set to an appropriate value as necessary. Here, it is assumed that α=1.

$$I_L \geq \alpha \cdot V_x \sqrt{\frac{2C}{L}} \quad (3)$$

If the inductor current $I_L$ is greater than or equal to $\alpha \cdot V_x \sqrt{(2C/L)}$ in Expression (3), ZVS of the switching element Q12 becomes possible. That is, a threshold current $I_{ref}$ can be expressed as $\alpha \cdot V_x \sqrt{(2C/L)}$. If the condition $|I_L| \geq |I_{ref}|$ is satisfied at each time when each switching element is turned on, ZVS of each switching element becomes possible.

Next, when the output power of the DC-DC converter 1 is expressed as P and $\tau_1$ and $\tau_2$ are expressed as $\tau_1=\tau_2=\tau$, the power P can be expressed by Expression (4) below.

$$P = \frac{V_x \cdot V_y}{2\pi L \omega}[-3\tau^2 + 4(\tau_C + \pi) - \tau_C^2 - 2\pi \cdot \tau_C - \pi^2] \quad (4)$$

where $V_y$ is the power supply voltage of the direct-current power supply E2 (see FIG. 1).

In Expression (4), $V_x$ and $V_y$ are known values, and $\tau_c$ is expressed by Expression (1) above. The power P is a target value desired to be output from the DC-DC converter 1 and is known. Therefore, if the target value of the power desired to be output from the DC-DC converter 1 is given, τ ($=\tau_1=\tau_2$) can be calculated from the inverse function of Expression (4).

The control circuit 30 controls switching of each of the first full-bridge circuit 10 and the second full-bridge circuit 20 such that $\tau_1$ and $\tau_2$ become τ obtained from Expression (4). Accordingly, the DC-DC converter 1 outputs the target power P.

As described above, since the switching frequency f is constant in the output angle modulation mode, it is possible to suppress an increase in switching loss resulting from an increase in switching frequency. Also, since there is no increase in switching frequency, it is possible to reduce heat generation of devices, in particular, the inductor L.

Moreover, the ZVS of each switching element in the first full-bridge circuit 10 and the second full-bridge circuit 20 can be achieved by causing the inductor current $I_L$ greater than or equal to the threshold current $I_{ref}$ to flow through the inductor L.

Next, the frequency modulation mode will be described.

As illustrated in FIG. 9, in the output angle modulation mode, the output power increases as T increases. When the output power P is greater than or equal to threshold power (hereinafter expressed as $P_T$), the control circuit 30 controls the output of the DC-DC converter 1 in the frequency modulation mode. The threshold power $P_T$ is one example of "first threshold power" according to the present invention.

First, the threshold power $P_T$ will be described.

Expression (4) above is in the form of a quadratic function with respect to T. Thus, τ have two solutions to the power P. In view of this, one τ is identified by a predetermined algorithm. For example, a solution may be obtained near the vertex of the quadratic function. In this case, it is possible to suppress the frequency and reduce heat generation. Alternatively, a solution may be obtained at a position away from the vertex of the quadratic function. In particular, Expression (5) below describes a calculation formula for favorable τ, which is applicable to the aforementioned algorithm.

$$\tau = \tfrac{2}{3}(\pi + \tau_c) \quad (5)$$

In the frequency modulation mode, when the output power of the DC-DC converter 1 is expressed as P, $\tau_1$ and $\tau_2$ are equal to each other and expressed as τ ($=\tau_1=\tau_2$), and $t_c$ that expresses $\tau_c$ in terms of time is used, the power P can be expressed by Expression (6) below.

$$P \frac{V_x \cdot V_y}{2\pi L}\left[-2\tau_C^2\omega + \frac{\pi^2 - \tau_{fix}^2}{\omega} + 4\tau_{fix}\tau_C - 2\tau_C\pi\right] \quad (6)$$

In Expression (6), $V_x$ and $V_y$ are known values, $\tau_c$ is expressed by Expression (1) above, and $\tau_{fix}$ is τ expressed by Expression (5). The power P is a target value desired to be output from the DC-DC converter 1 and is known. Thus, w can be calculated from the inverse function of Expression (6). Then, the switching frequency f can be calculated from ω.

The control circuit 30 uses the switching frequency f obtained from Expression (6) to control the switching of each switching element in the first full-bridge circuit 10 and the second full-bridge circuit 20. Accordingly, the DC-DC converter 1 outputs the target power P.

In the frequency modulation mode, the output power increases as the switching frequency f decreases, as illustrated in FIG. 9. That is, there is no increase in switching frequency f in the frequency modulation mode. Thus, it is possible to suppress an increase in switching loss resulting from an increase in switching frequency. Moreover, since there is no increase in switching frequency, it is possible to reduce heat generation of devices, in particular, the inductor L.

Also, ZVS of each switching element in the first full-bridge circuit 10 and the second full-bridge circuit 20 can be achieved by causing the inductor current $I_L$ greater than or equal to the threshold current $I_{ref}$ to flow through the inductor L as in the output angle modulation mode.

As described above, in the present embodiment, it is possible to suppress an increase in switching loss resulting from an increase in switching frequency. Moreover, since there is no increase in switching frequency, it is possible to reduce heat generation of devices, in particular, the inductor L. Besides, high-efficiency power conversion becomes possible because the ZVS of each switching element is achieved. This control eliminates the need to provide a detection circuit in the circuit and does not require complicated control. Thus, it is possible to perform ZVS operations by simple control and to reduce switching losses.

4. Variations

While one embodiment of the invention has been described thus far, the present invention is not intended to be limited to the above-described embodiment.

In the above-described embodiment, the output angle modulation mode is executed when the DC-DC converter 1 outputs low power, and the frequency modulation mode is executed when the DC-DC converter 1 outputs high power. However, the present invention is not limited thereto. The frequency modulation mode may be executed when the DC-DC converter 1 outputs low power, and the output angle modulation mode may be executed when the DC-DC converter 1 output high power.

When the target value for the output power of the DC-DC converter 1 is greater than or equal to threshold power (second threshold power) that is greater than the threshold power $P_T$, the control circuit 30 may execute a phase control mode. The phase control mode is a mode of changing the phase of the voltage on the first winding n1 and the phase of the voltage on the second winding n2 while keeping the switching frequency f constant. That is, it is the mode of changing the phase difference δ between V1 and V2. The phase difference δ can be changed by changing a phase difference between each switching element in the first full-bridge circuit 10 and each switching element in the second full-bridge circuit 20.

In the phase control mode, the output power P is expressed by Expression (7) below. In expression (7), n is the turns ratio between the first winding n1 and the second winding n2.

$$P = \frac{nV_xV_y}{\omega L}\delta\left(1 - \frac{\delta}{\pi}\right) \quad (7)$$

As can be seen from Expression (7), the output power P can be controlled by changing the phase difference δ between the first full-bridge circuit 10 and the second full-bridge circuit 20.

Alternatively, the output angle modulation mode and the phase control mode may be switched and executed depending on the output power of the DC-DC converter 1.

Moreover, in the above-described embodiment, Expression (4) is based on the condition of $\tau=\tau_1=\tau_2$, but $\tau_1$ may be different from $\tau_2$. In this case, $\tau_1$ and $\tau_2$ for outputting the target power P can be calculated by Expression (8) below.

$$P = \frac{V_x \cdot V_y}{2\pi L\omega}$$
$$[2\tau_C^2 - 2\tau_2\tau_C - 2\tau_1\tau_C + 2\pi\tau_C + \tau_2^2 + \tau_1\tau_2 - 2\pi\tau_2 + \tau_1^2 - 2\pi\tau_1 + \pi^2] \quad (8)$$

The above embodiment has been described on the assumption that the input/output terminals IO11 and IO12 are on the input side and the input/output terminals IO21 and IO22 are on the output side. However, the DC-DC converter 1 is capable of bidirectional power transfer. Accordingly, the input/output terminals IO11 and IO12 may be on the output side and the input/output terminals IO21 and IO22 may be on the input side. This case can be described in the same manner as in the above-described embodiment, and therefore a description thereof is omitted. Note that the DC-DC converter 1 does not necessarily have to be a bidirectional converter.

In the above-described embodiment, the polarity inversion period $\tau_c$ is set at a fixed value, but this period may be a variable. In the above-described embodiment, ZVS operations can be achieved if the polarity inversion period is set to a value greater than or equal to the aforementioned fixed value.

Each element in the above-described embodiments and variations may be combined appropriately within a range that presents no contradictions.

REFERENCE SIGNS LIST

1 DC-DC converter
10 First full-bridge circuit
20 Second full-bridge circuit
30 Control circuit
C11, C12, C13, C14 Capacitor
C21, C22, C23, C24 Capacitor
D11, D12, D13, D14 Diode
D21, D22, D23, D24 Diode
E1, E2 Direct-current power supply
IL Inductor current
IO11, IO12 Input/output terminal
IO21, IO22 Input/output terminal
L Inductor
L1 Inductor
Q11, Q12, Q13, Q14 Switching element
Q21, Q22, Q23, Q24 Switching element
T Transformer
V1 Voltage
V2 Voltage

The invention claimed is:

1. A DC-DC converter comprising:
a first full-bridge circuit including four switching elements and four capacitors connected respectively to the four switches;
a second full-bridge circuit including four switching elements and four capacitors connected respectively to the four switches;
a transformer including a first winding and a second winding, the first winding being connected to said first full-bridge circuit, and the second winding being connected to said second full-bridge circuit and magnetically coupled to said first winding;
an inductance component connected in series with said first winding or said second winding; and
a control circuit that controls soft switching of each switching element in said first full-bridge circuit and said second full-bridge circuit,
wherein each of the capacitors is a parasitic capacitance or a combination of a parasitic capacitance and an actual element,
wherein said control circuit is configured to execute an output angle modulation mode and a frequency modulation mode, and switches a mode of execution to said output angle modulation mode or said frequency modulation mode depending on target power desired to be output, the output angle modulation mode being a mode of adjusting a voltage output period of said first full-bridge circuit and a voltage output period of said second full-bridge circuit, and the frequency modulation mode being a mode of adjusting a switching frequency.

2. The DC-DC converter according to claim 1, wherein an inductor current flowing through an equivalent inductor at a time of switching of turning on or off each switching element is greater than or equal to a threshold current, the equivalent inductor being equivalent to said transformer and said inductance component.

3. The DC-DC converter according to claim 1, wherein said control circuit executes said output angle modulation mode when said target power is less than threshold power, and
said control circuit executes said frequency modulation mode when said target power is greater than or equal to said threshold power.

4. The DC-DC converter according to claim 1, wherein said control circuit is capable of executing said output angle modulation mode, said frequency modulation mode, and a phase control mode and executes said output angle modulation mode, said frequency modulation mode, or said phase control mode depending on target power desired to be output, the phase control mode being a mode of changing a phase of a voltage on the first winding and a phase of a voltage on the second winding.

5. The DC-DC converter according to claim 4, wherein said control circuit executes said output angle modulation mode when said target power is less than first threshold power,
said control circuit executes said frequency modulation mode when said target power is greater than or equal to said first threshold power, and
said control circuit executes said phase control mode when said target power is greater than or equal to second threshold power that is greater than said first threshold power.

6. A DC-DC converter comprising:
a first full-bridge circuit including four switching elements and four capacitors connected respectively to the four switches;
a second full-bridge circuit including four switching elements and four capacitors connected respectively to the four switches;
a transformer including a first winding and a second winding, the first winding being connected to said first full-bridge circuit, and the second winding being connected to said second full-bridge circuit and magnetically coupled to said first winding;
an inductance component connected in series with said first winding or said second winding; and
a control circuit that controls soft switching of each switching element in said first full-bridge circuit and said second full-bridge circuit,
wherein each of the capacitors is a parasitic capacitance or a combination of a parasitic capacitance and an actual element,
wherein said control circuit is configured to execute an output angle modulation mode or a phase control mode, and switches a mode of execution to said output angle modulation mode or said phase control mode depending on target power desired to be output, the output angle modulation mode being a mode of adjusting a voltage output period of said first full-bridge circuit and a voltage output period of said second full-bridge circuit, and the phase control mode being a mode of changing a phase of a voltage on said first winding and a phase of a voltage on said second winding.

7. The DC-DC converter according to claim 6, wherein an inductor current flowing through an equivalent inductor at a time of switching of turning on or off each switching element is greater than or equal to a threshold current, the equivalent inductor being equivalent to said transformer and said inductance component.

8. The DC-DC converter according to claim 1, wherein said threshold current is set to make energy accumulated in said equivalent inductor greater than or equal to energy accumulated in two of said capacitors of the first or second full-bridge circuit.

9. The DC-DC converter according to claim 8, wherein the following expression is satisfied:

$$I_{ref}=\alpha \cdot V_x \sqrt{(2C/L)}$$

where $I_{ref}$ is said threshold current, $V_x$ is an input voltage of said first full-bridge circuit, C is a capacitance of said capacitors, L is an inductance of said equivalent inductor, and $\alpha$ is a correction factor.

10. The DC-DC converter according to claim 2, wherein said control circuit executes said output angle modulation mode when said target power is less than threshold power, and said control circuit executes said frequency modulation mode when said target power is greater than or equal to said threshold power.

11. The DC-DC converter according to claim 2, wherein said control circuit is capable of executing said output angle modulation mode, said frequency modulation mode, and a phase control mode and executes said output angle modulation mode, said frequency modulation mode, or said phase control mode depending on target power desired to be output, the phase control mode being a mode of changing a phase of a voltage on the first winding and a phase of a voltage on the second winding.

12. The DC-DC converter according to claim 2, wherein
the first full-bridge circuit includes capacitors connected respectively to the four switches in parallel,
the second full-bridge circuit includes capacitors connected respectively to the four switches in parallel, and
said threshold current is set to make energy accumulated in said equivalent inductor greater than or equal to energy accumulated in two of said capacitors of the first or second full-bridge circuit.

13. The DC-DC converter according to claim 12, wherein the following expression is satisfied:

$$I_{ref}=\alpha \cdot V_x \sqrt{(2C/L)}$$

where $I_{ref}$ is said threshold current, $V_x$ is an input voltage of said first full-bridge circuit, C is a capacitance of said capacitors, L is an inductance of said equivalent inductor, and $\alpha$ is a correction factor.

* * * * *